United States Patent
Anderson (10) Patent No.: US 10,831,199 B2
(45) Date of Patent: Nov. 10, 2020

(54) USING UNMANNED AERIAL VEHICLES TO PROVIDE GROUND CONTROL POINTS FOR AERIAL SURVEY

(71) Applicant: Deere & Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 196 days.

(21) Appl. No.: 15/720,207

(22) Filed: Sep. 29, 2017

(65) Prior Publication Data

US 2019/0101921 A1 Apr. 4, 2019

(51) Int. Cl.

| | | |
|---|---|---|
| *G05D 1/02* | (2020.01) | |
| *G05D 1/00* | (2006.01) | |
| *B64C 39/02* | (2006.01) | |
| *G05D 1/10* | (2006.01) | |
| *G01C 11/00* | (2006.01) | |
| *G01C 11/02* | (2006.01) | |

(52) U.S. Cl.
CPC ......... *G05D 1/0202* (2013.01); *B64C 39/024* (2013.01); *G01C 11/00* (2013.01); *G01C 11/02* (2013.01); *G05D 1/0027* (2013.01); *G05D 1/0094* (2013.01); *G05D 1/102* (2013.01); *B64C 2201/123* (2013.01); *B64C 2201/145* (2013.01)

(58) Field of Classification Search
CPC .. G05D 1/0202; G05D 1/0027; G05D 1/0094; G05D 1/102; G05D 1/0088; B64C 39/024; B64C 2201/123; B64C 2201/145; G01C 11/00; G01C 11/02; G06T 1/0014; H04Q 9/00

See application file for complete search history.

(56) References Cited

U.S. PATENT DOCUMENTS

| | | |
|---|---|---|
| 6,255,793 B1 | 7/2001 | Peless et al. |
| 6,674,687 B2 | 1/2004 | Zeitzew |
| 6,984,952 B2 | 1/2006 | Peless et al. |
| 7,286,624 B2 | 10/2007 | Woo et al. |
| 7,343,222 B2 | 3/2008 | Solomon |
| 8,063,774 B2 | 11/2011 | Anderson |
| 8,112,176 B2 | 2/2012 | Solomon |
| 8,234,010 B2 | 7/2012 | Thompson et al. |
| 9,026,315 B2 | 5/2015 | Anderson |

(Continued)

FOREIGN PATENT DOCUMENTS

| | | |
|---|---|---|
| KR | 1020180021604 A | 3/2018 |
| WO | 2014113460 A1 | 7/2014 |
| WO | 17024358 A1 | 2/2017 |

OTHER PUBLICATIONS https://support.dronedeploy.com/v1.0/docs/working-gcp-step-by-step, Accessed Sep. 28, 2107. 6 pages.

(Continued)

*Primary Examiner* — Kimberly S Berona
*Assistant Examiner* — Michael V Kerrigan
(74) *Attorney, Agent, or Firm* — Joseph R. Kelly; Kelly, Holt & Christenson, PLLC (57) ABSTRACT

An unmanned aerial vehicle (UAV) flies to a location of a ground control point, and provides a mark for imaging by an aerial vehicle. The UAV remains at the ground control point and collects GNSS data to localize the point. The ground control point may be marked on the ground by the UAV, or it may be on an upper surface of the UAV that is visible to the aerial vehicle.

18 Claims, 9 Drawing Sheets

(56) References Cited

U.S. PATENT DOCUMENTS

| | | | |
|---|---|---|---|
| 9,235,823 B2 | 1/2016 | Rushing | |
| 9,282,693 B2 | 3/2016 | Anderson | |
| 9,592,912 B1* | 3/2017 | Michini | G01C 15/02 |
| 2005/0251291 A1 | 11/2005 | Solomon | |
| 2008/0262718 A1 | 10/2008 | Farwell | |
| 2011/0181289 A1 | 7/2011 | Rushing | |
| 2017/0109577 A1 | 4/2017 | Wang et al. | |
| 2017/0278030 A1 | 9/2017 | Pettersson et al. | |
| 2018/0074521 A1* | 3/2018 | Cantrell | B60L 53/53 |
| 2018/0274920 A1* | 9/2018 | Sasaki | G01C 11/06 |

OTHER PUBLICATIONS

A localization System for Autonomous Golf Course Mowers. http://citeseerx.ist.psu.edu/viewdoc/download?doi=10.1.1.97.8200&rep=rep1&type=pdf, Nov. 2002, 122 pages.

Mobile Robot Localization from Large Scale Appearance Mosaics, Dec. 1, 2000, 60 pages. http://citeseerx.ist.psu.edu/viewdoc/download?doi=10.1.1.6.8505&rep=rep1 &type=pdf.

MS Thesis "Applying cooperative localization to swarm UAVs using an extended Kalman filter" (Davis 2014) http://www.dtic.mil/dtic/tr/fulltext/u2/a619486.pdf, 107 pages.

Automatic segmentation of fiducial marks using attribute-based mathematical morphology Wu (2001) http://vision-cdc.csiro.au/changs/doc/sun-wu01jei.pdf, Apr. 200, 9 pages.

On the potential of small UAS for multispectral remote sensing in large-scale agricultural and archeological applicatiohs Retzlaff (2016) http://ubt.opus.hbznrw.de/volltexte/2016/967/pdf/Retzlaff_Rebecca_2016_Dissertation_600dpi.pdf, 327 pages.

https://www.propelleraero.com/aeropoints/ 5 pages. Accessed Sep. 28, 2107.

German Search Report issued in counterpart application No. 102018214487.7 dated Apr. 29, 2019 (12 pages).

* cited by examiner

USING UNMANNED AERIAL VEHICLES TO PROVIDE GROUND CONTROL POINTS FOR AERIAL SURVEY

FIELD OF THE DESCRIPTION

The present description relates to providing ground control points on a worksite. More specifically, the present description relates to using unmanned aerial vehicles to mark ground control points on the worksite.

BACKGROUND

There are a wide variety of different types of scenarios where aerial surveys are used. For instance, in some scenarios, such as at various different types of worksites, unmanned aerial vehicles fly over the worksite and take images that overlap one another. The images are then stitched together in order to obtain an overall image of the worksite. The images can also exhibit a stereo effect which provides three dimensional measurement of some characteristics at the worksite.

In order to tie the images back to a standard coordinate system for the Earth, such as the World Geodetic System (WGS) representation of Earth, ground control points are used. Ground control points are points that are marked with a visual, or otherwise detectable, marker, on the surface of the Earth, that has a known location. Because the ground control points have a known location, the aerial image can be tied back to a standard representation of the Earth.

Establishing ground control points for aerial survey can be very time consuming and error prone. Some current systems for establishing ground control points involve sending a human being with a survey-grade global navigation satellite system (GNSS) receiver to the location of the ground control point to be established. The human then stands at that location for several minutes so that the GNSS receiver can collect the data used for precise localization of that spot. A mark (such as an X) may be placed at the point for which the GNSS receiver collected the information.

Besides being labor intensive, the process can introduce significant error into the ground control point location information. For instance, the human normally has the GNSS receiver mounted to one end of a pole. The opposite end of the pole is placed at the ground control point for which the GNSS data is to be collected. If the human moves the pole mounted GNSS receiver, this can introduce error. In addition, placing the X (or other mark) relative to the location of the pole may also introduce error. Further, correlating the location of the pole to the X, in an aerial image may introduce error due to the width of the X (or other mark) and due to inconsistency of how the mark is generated or applied to the ground control point. Further, when ground control points are marked on the surface of the Earth, they can be lost due to ongoing work at the worksite.

In addition, it can be dangerous for human beings to reach ground control points. By way of example, it may be that a ground control point is to be located on a ledge of a quarry, on an island in a swamp, or another point that can be difficult or dangerous to reach.

The discussion above is merely provided for general background information and is not intended to be used as an aid in determining the scope of the claimed subject matter.

SUMMARY

An unmanned aerial vehicle (UAV) flies to a location of a ground control point, and provides a mark for imaging by an aerial vehicle. The UAV remains at the ground control point and collects GNSS data to localize the point. The ground control point may be marked on the ground by the UAV, or it may be on an upper surface of the UAV that is visible by the aerial vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
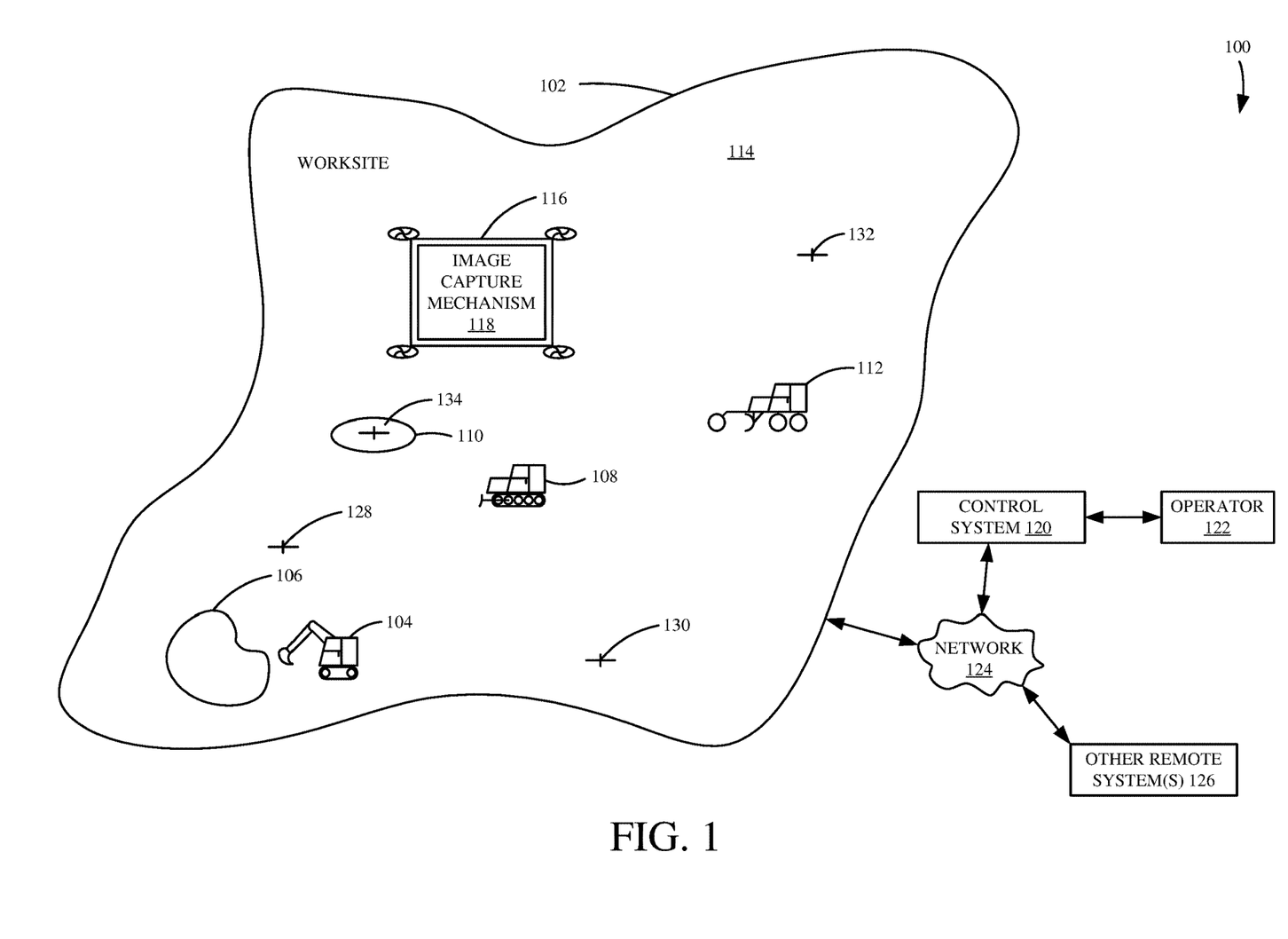
FIG. 1 is a partial pictorial representation and a partial block diagram of a worksite.

FIG. 1 is a partial pictorial diagram and partial block diagram of a worksite architecture 100. Architecture 100 shows worksite 102 that may have one or more vehicles, such as excavator 104 that works in a pile 106, dozer 108 that is illustrated pushing material into a hole 110, and grader 112 that may grade a surface 114, among others. Worksite 102 may also be accessible by one or more unmanned aerial vehicles 116. In the example shown in FIG. 1, UAV 116 includes image capture mechanism 118 that can be used to capture aerial images of worksite 102.

FIG. 1 also shows that, in one example, control system 120 can be used by an operator 122 in order to access (e.g., communicate with or control) UAV 116 over a network 124. Other remote systems 126 can also interact with control system 120, operator 122, UAV 116, among other things, either directly or over network 124. Therefore, in one example, network 124 can include a cellular network, a local area network, a wide area network, a near field communication network, or any of a wide variety of other networks or combinations of networks or communication systems.

It may be that UAV 116 (or a plurality of different UAVs) are to fly over worksite 102 and capture aerial images of worksite 102. In that example, control system 120 can automatically control UAV 116 (or operator 122 can manually control UAV 116 through control system 120) to fly to the various locations over worksite 102 where the aerial images are to be taken. A route or mission plan can also be loaded into a navigation and control system on UAV 116 as well. In one example, the aerial images are taken so that they overlap one another and can be stitched together to provide a single image of worksite 102. That image may be tied back to a standard coordinate system of the Earth so that it can be accurately located on the surface of the Earth. One such standard coordinate system is the World Geodetic System (WGS).

In order to tie the aerial image back to the standard coordinate system, a plurality of different ground control points may be used. In the example shown in FIG. 1, the ground control points are identified by markers 128, 130, 132 and 134. Therefore, in one example, a survey-grade GNSS receiver is moved to each of the ground control points (128-134) where detailed GNSS data is collected so that those points can be localized to (or tied back to) the standard coordinate system with survey level accuracy.

Figure 2:
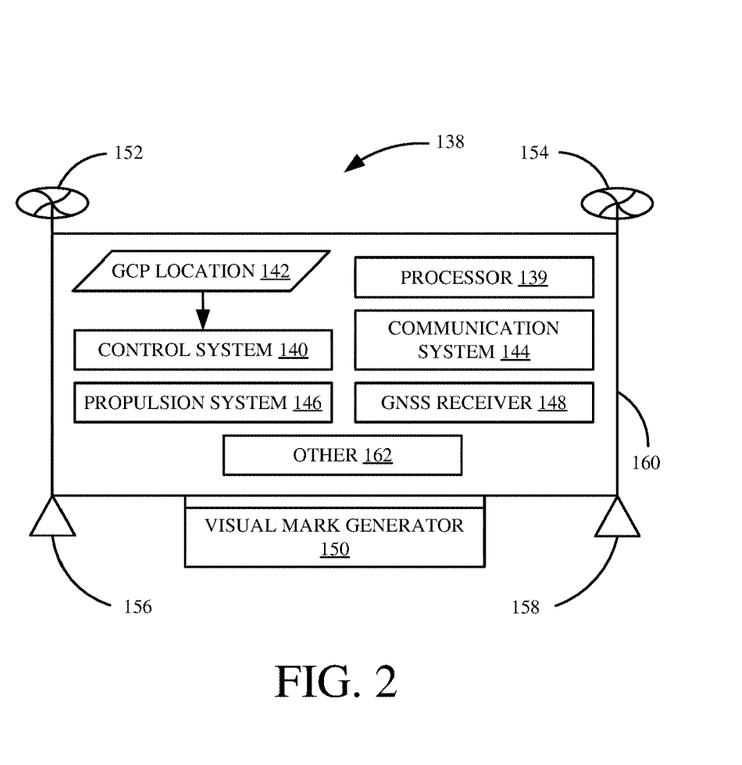
FIG. 2 is a block diagram of one example of an unmanned aerial vehicle (UAV) that provides a ground control point (GCP) marker.
Figure 3:
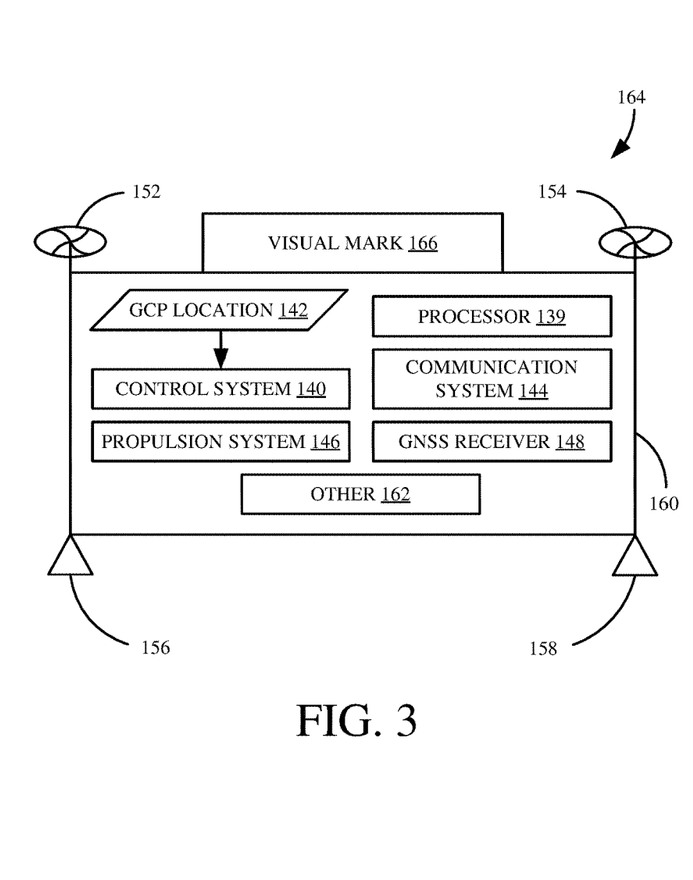
FIG. 3 is a block diagram of another UAV that provides a GCP marker.

In one example, a UAV is fitted with a survey-grade GNSS receiver and is flown to the ground control points 128-134 (some examples of such UAVs are described below). It then marks those points and collects the detailed GNSS data for each of the points. As is described in greater detail below, the ground control points can be marked by the UAV, itself, or a mark can be deposited on the ground by the UAV that collects the GNSS data. FIGS. 2 and 3 show block diagrams of two different examples of UAVs that can be used to mark the ground control points, and to collect the detailed GNSS data for those points. It will be appreciated that the UAVs shown in FIGS. 2 and 3 can be the same as UAV 116, or different UAVs. They are described herein as different UAVs for the sake of example only.

FIG. 2 shows UAV 138 that includes a processor 139, a control system 140 that receives a ground control point location 142. UAV 138 is also shown with communication system 144, propulsion system 146, GNSS receiver 148, visual mark generator 150, propulsion mechanisms 152-154, landing gear 156-158, which are mounted to a UAV frame 160. UAV 138 can include a wide variety of other items 162 as well. Before describing the operation of UAV 138 in more detail, a brief description of some of the items on UAV 138, and their operation, will first be provided.

In the example illustrated in FIG. 2, control system 140 receives the GCP location 142 (which may be a longitude and latitude or other location identifiers) and controls propulsion system 146 (which in turn, controls propulsion mechanisms 152-154) to navigate UAV 138 to the ground control point, where it lands using landing gear 156-158. It will be noted that UAV 138 can be remotely controlled as well, so that navigation instructions can be received over communication system 144.

Once at the GCP location 142, control system 140 controls visual mark generator 150 to deposit or otherwise generate a mark corresponding to the ground at the GCP location. In one example, visual mark generator 150 is a pigment dispenser (such as a paint sprayer or paint dispenser) which deposits pigment on the ground to make the mark. In another example, visual mark generator 150 illustratively carries a pre-printed mark on a medium which is deposited (e.g., dropped) at the GCP location. These are examples only. UAV 138 is then controlled to remain at the GCP location while GNSS receiver 148 receives GNSS data with survey grade accuracy. GNSS receiver 148 may also include one or more pose sensors to further increase accuracy by compensating for offset of the GNSS antenna (used by GNSS receiver 148) which may be due to a slope of the terrain that landing gear 156-158 is resting upon, or for offset incurred for other reasons.

Therefore, once the mark is generated on the ground by visual mark generator 150, and once the GNSS receiver 148 has collected the GNSS data for that ground control point, UAV 138 can be controlled to fly away from the ground control point so that the aerial image (that will include the ground control point marked by mark generator 150) can be taken. UAV 138 can then store the GNSS data for that ground control point or transmit it to control system 130 or any other remote systems 126. It should be noted that, in one example, UAV 138 is also fitted with the image capture mechanism 118 (illustrated in FIG. 1) so that it can also take the aerial image once it has generated the GCP mark. This is only one example.

FIG. 3 shows another example of a UAV 164. Some of the items on UAV 164 are similar to those shown on UAV 138 in FIG. 2, and they are similarly numbered. However, instead of having visual mark generator 150 disposed on frame 160, UAV 164 has a visual mark 166 fixedly attached to it (in a known spatial relationship to GNSS receiver 148) on its upper surface, or on another surface that is visible by the aerial vehicle that will be taking the aerial image. Therefore, when UAV 164 is used, it is first flown to the GCP location 142 where it is landed. The GNSS receiver 148 again collects the survey grade GNSS data for that GCP location. UAV 164 is controlled to remain in place, at that GCP location, until the aerial vehicle has taken the aerial image that includes the GCP represented by visual mark 166. Thus, UAV 164, itself, has the visual marker disposed on its frame 160 and so UAV 164, itself, acts as the GCP mark. Once the GNSS data has been received, and once the aerial image has been taken, then UAV 164 can fly to another location.

It will also be noted that a single UAV can have both the visual mark generator 150 and the visual mark 166 disposed on it. Either one of them can be used for generating the GCP mark, based upon the particular application or scenario where the GCP mark is being made. In addition, it will be noted that UAV 164 can also have an image capture mechanism 118 (as discussed above with respect to FIG. 1). Therefore, it can take aerial images of other UAVs that are acting as GCP marks, or of other GCP marks generated by visual mark generator 150 (or that of other UAVs), when it is not, itself, acting as a GCP mark. All of these variations are contemplated herein.

Figure 4A:
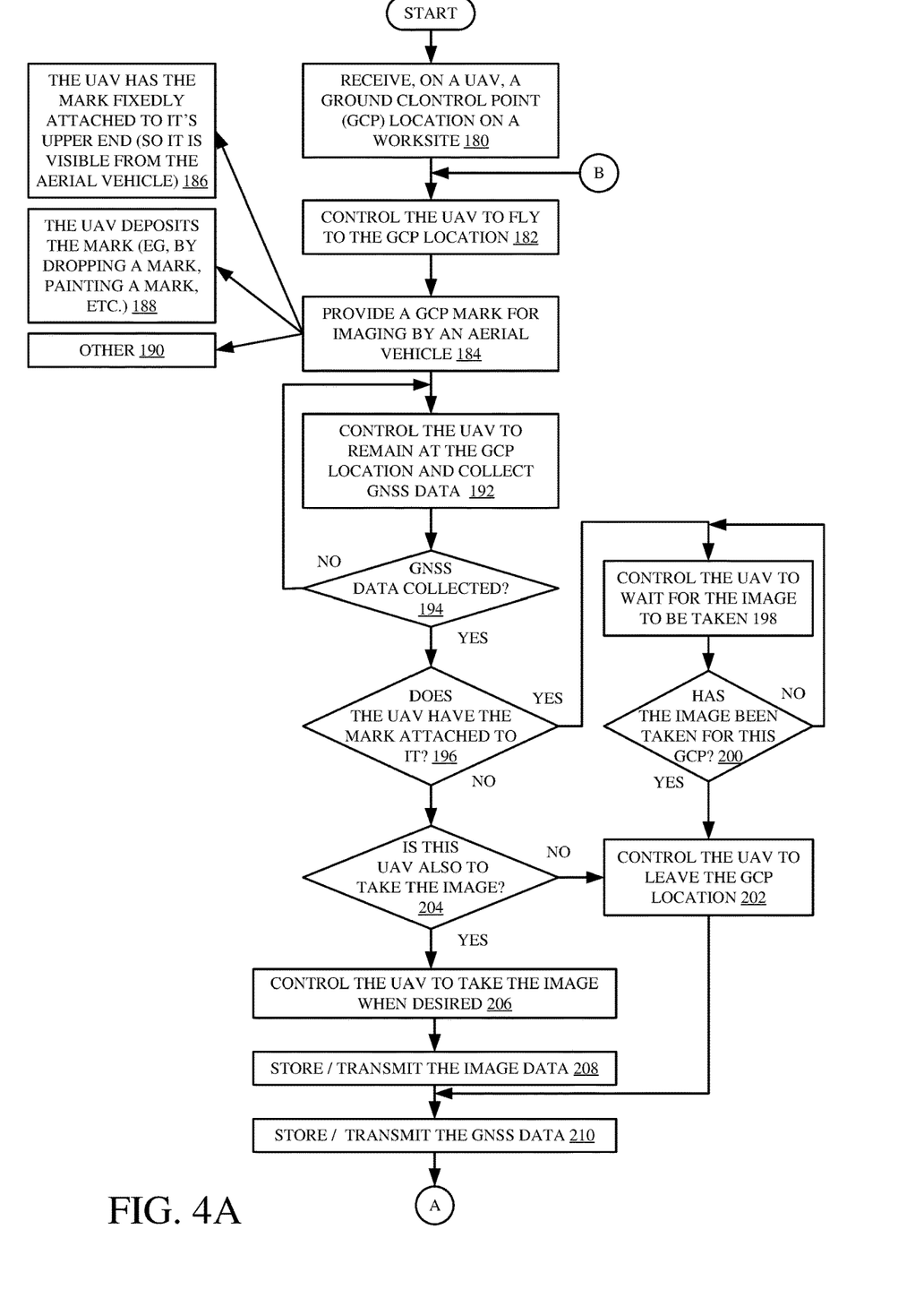
FIGS. 4A and 4B (collectively referred to herein as FIG. 4) illustrate a block diagram showing one example of the operation of a UAV in providing a GCP mark.
Figure 4B:
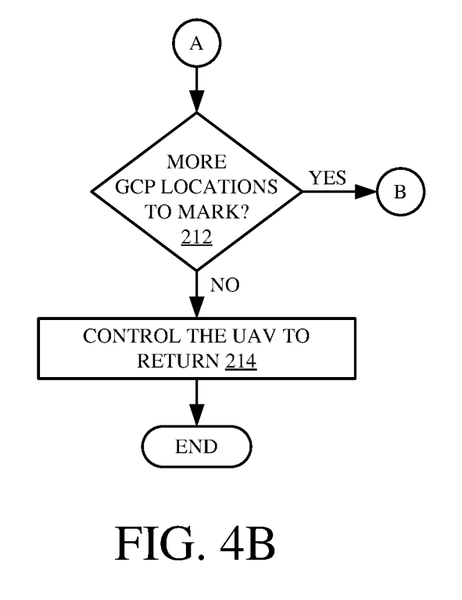

FIGS. 4A and 4B (collectively referred to herein as FIG. 4) illustrate a flow diagram showing one example of the operation of UAV 138 and/or UAV 164 in generating GCP marks and in gathering GNSS data for those marks so that they can be used in tying an aerial image back to a standard coordinate system. One or more UAVs 138-164 first receive a ground control point (GCP) location for a worksite 102. This may be a GPS location or another location that can be navigated to by the UAVs 138-164. Receiving the GCP location is indicated by block 180 in the flow diagram of FIG. 4. The UAV is then controlled to fly to the GCP location. Where multiple UAVs are programmed with different GCP locations, they are illustratively all controlled to fly to their corresponding GCP location. Controlling the UAVs to fly to the GCP locations is indicated by block 182. Again, it will be noted that the GCP location can be given to a UAV (e.g., UAV 138), and control system 140 can automatically control propulsion system 146 to navigate to the GCP location. In another example, an operator 122 can control the navigation of the UAV through a remote control system 120, or in other ways.

Once at the GCP location, the UAV provides a GCP mark for imaging by an aerial vehicle. This is indicated by block 184. As discussed above, UAV 164 may have the visual mark 166 fixedly attached to its upper end (or to another surface that is visible from the aerial vehicle). This is indicated by block 186. In another example, the UAV (such as UAV 138) may have a UAV mark generator 150 that deposits the mark (e.g., by actuating an actuator to release or drop a marker or depositing paint, or other pigment) at the GCP location. This is indicated by block 188. The UAV can provide the GCP mark in other ways as well, and this is indicated by block 190.

Whether the UAV is, itself, acting as the GCP mark (such as in the case of UAV 164) or whether it deposits or generates the mark on the ground (such as in the case of UAV 138) the UAV is illustratively controlled to remain at the GCP location and collect the sufficient GNSS data so that the aerial image using the GCP mark can be referenced back to a standard coordinate system. Controlling the UAV to remain at the GCP location for the collection of GNSS data is indicated by block 192.

Once the GNSS data is collected as indicated by block 194, then the operation of the particular UAV will depend on whether the UAV is, itself, acting as the GCP mark, or whether it is generating a mark on the ground. This determination is indicated by block 196.

If, at block 196, it is determined that this UAV is, itself, acting as the GCP mark (such as in the case of UAV 164), then UAV 164 is controlled to wait at the GCP location for the aerial image to be taken. This is indicated by block 198. For example, it may be that another UAV flies over the GCP location and takes the aerial image (or images) that are to be used. That UAV then may directly communicate that it has taken the aerial image, to UAV 164, or a communication can be provided from another source, such as from operator 122, control system 120, etc.

Once the aerial image has been taken for that GCP location, as indicated by block 200, then the UAV marking the GCP is controlled to leave the GCP location. This is indicated by block 202.

If, at block 196, it is determined that this UAV is not, itself, acting as the GCP mark, then it is determined whether this UAV (e.g., UAV 138) is also to take the aerial image that includes the GCP mark. This is indicated by block 204. If so, then the UAV is controlled to take the image when desired. This is indicated by block 206. The image data can be stored and transmitted to a remote system or otherwise, as desired. This is indicated by block 208.

In either case (whether the UAV 164 has acted as the GCP, or UAV 138 has generated a GCP mark on the ground), once the UAV has collected the GNSS data, that data is either stored on the UAV itself, or transmitted to a remote location where it can be stored or processed. This is indicated by block 210.

If there are more GCP locations to mark, as indicated by block 212, then processing can revert to block 182 where the UAV is controlled to fly to its next GCP location. If not, then the UAV can be controlled to return, such as for refueling, recharging, etc. This is indicated by block 214.

It can be seen that a number of different scenarios are provided. For instance, a single UAV (such as UAV 138), which includes an image capture mechanism 118, can generate the marks for a plurality of different GCP locations, and also take the overlapping aerial images that include those marks. The UAV 138 may be programmed with a plurality of different GCP locations, and it can fly to those locations, generate the GCP mark, and collect the GNSS data for those locations. It can then re-fly over the worksite to capture the aerial images that include those marks.

In another scenario, multiple UAVs can be used. While some are generating marks on the ground, others can be taking the aerial images.

In yet another example, multiple UAVs 164 can be used. For instance, it may be that a first set of UAVs are flown to GCP locations where they land, and, themselves, act as the GCP mark while they are collecting the GNSS data. At the same time, a second set of UAVs 164 can fly over those GCP marks and take the aerial images. After the aerial images are taken, the second set of UAVs can fly to a subsequent set of GCP locations, land, and begin collecting the GNSS data. While that is happening, the first set of UAVs can fly over the second set of UAVs to take the aerial image. They can then fly to yet another set of GCP locations, etc. This type of "leapfrog" or "swarm" scenario can increase the speed at which accurate GCPs are established.

All of these scenarios increase the accuracy with which GCPs are established. They also drastically reduce the cumbersome and time consuming nature of establishing the GCPs, and they can also enable establishing GCPs where they could previously not be established due to safety or other considerations. The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays may have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores may have also been discussed or may be used to store the GCP data, etc. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 5:
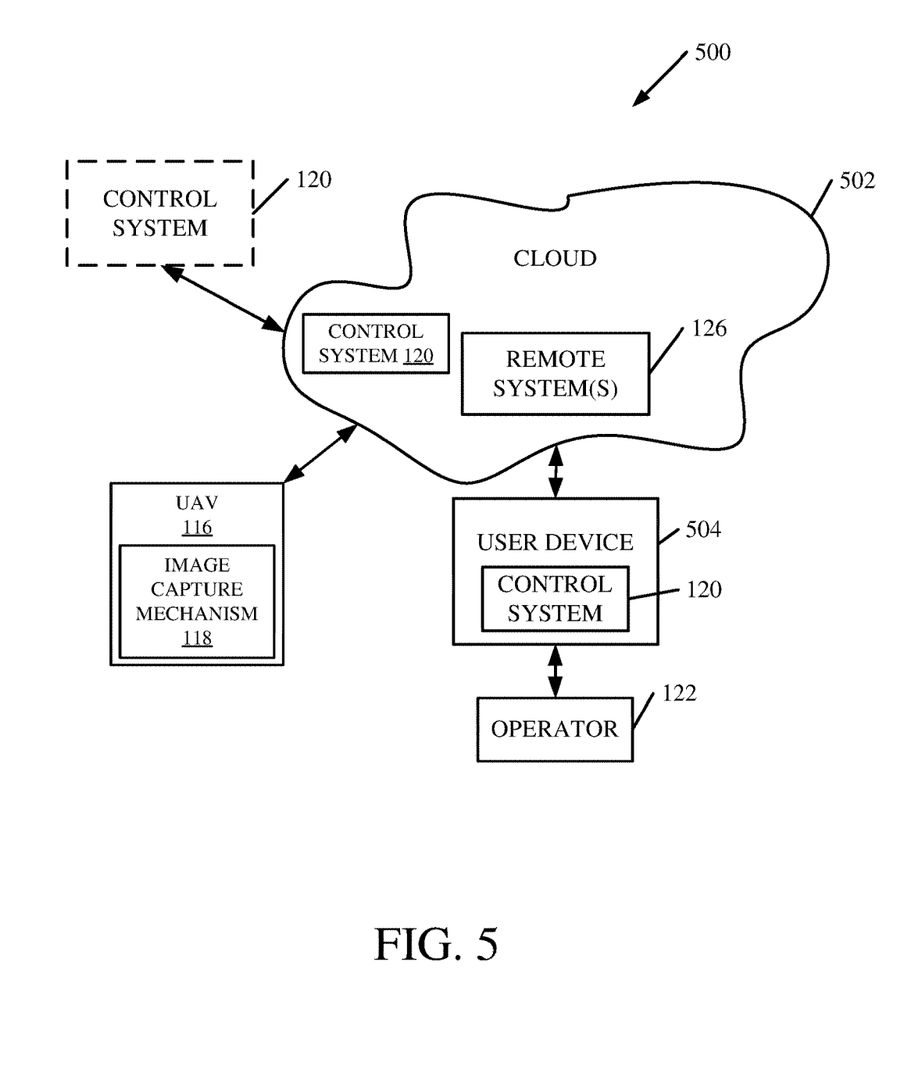
FIG. 5 shows some of the items in FIG. 1, deployed in a remote server architecture.

FIG. 5 is a block diagram of the architecture, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 1 and they are similarly numbered. FIG. 5 specifically shows that control system 120 and/or remote systems 126 can be located at a remote server location 502. Therefore, operator 122 can access those systems (and UAV 116) using a user device 504 through remote server location 502.

FIG. 5 also depicts another example of a remote server architecture. FIG. 5 shows that it is also contemplated that some elements of FIG. 1 are disposed at remote server location 502 while others are not. By way of example, control system 120 can be disposed at a location separate from location 502, and accessed through the remote server at location 502. Regardless of where they are located, they can be accessed directly by operator 122, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. All of these architectures are contemplated herein.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
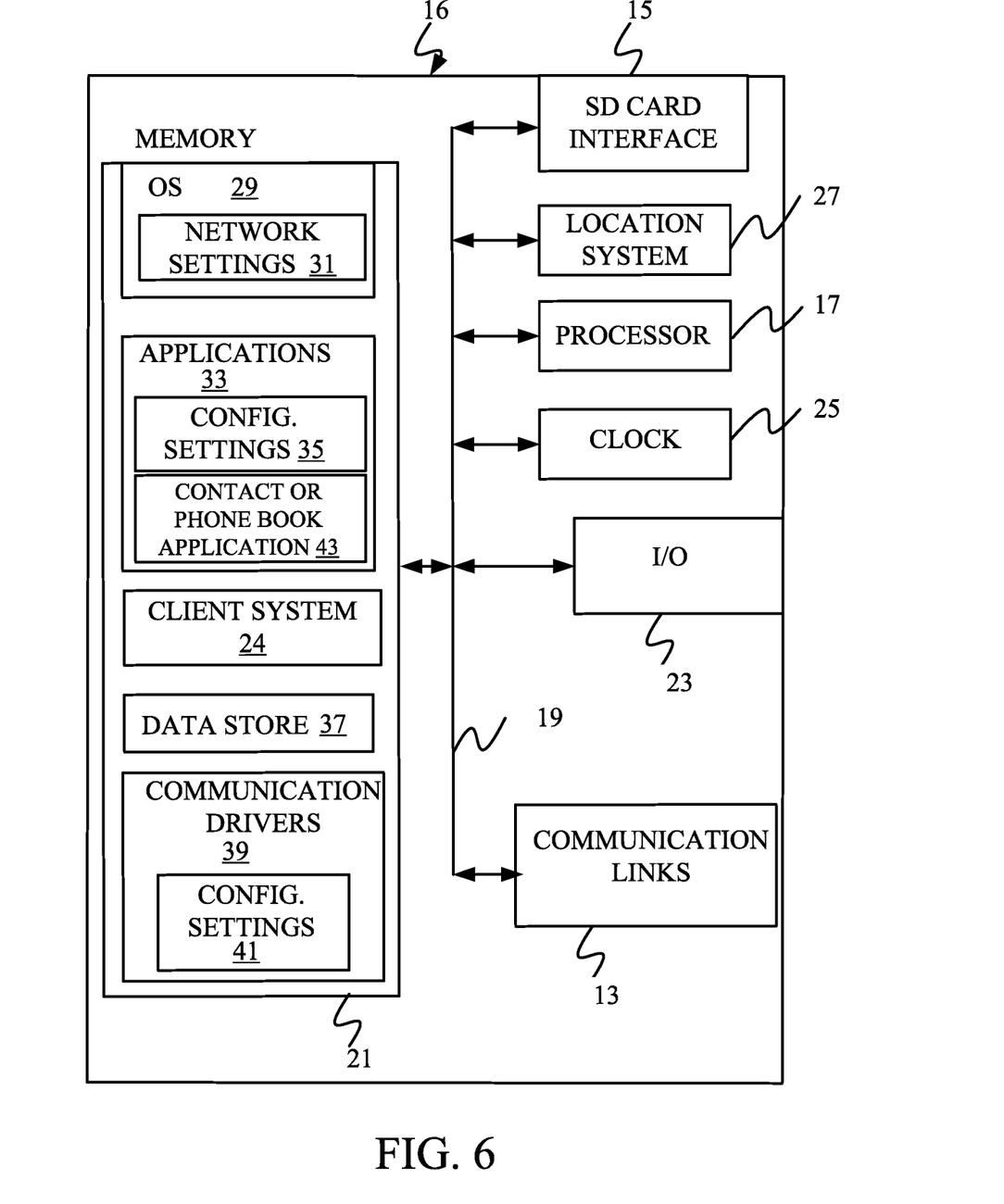
FIGS. 6-8 show examples of devices that can be used at a worksite.
Figure 7:
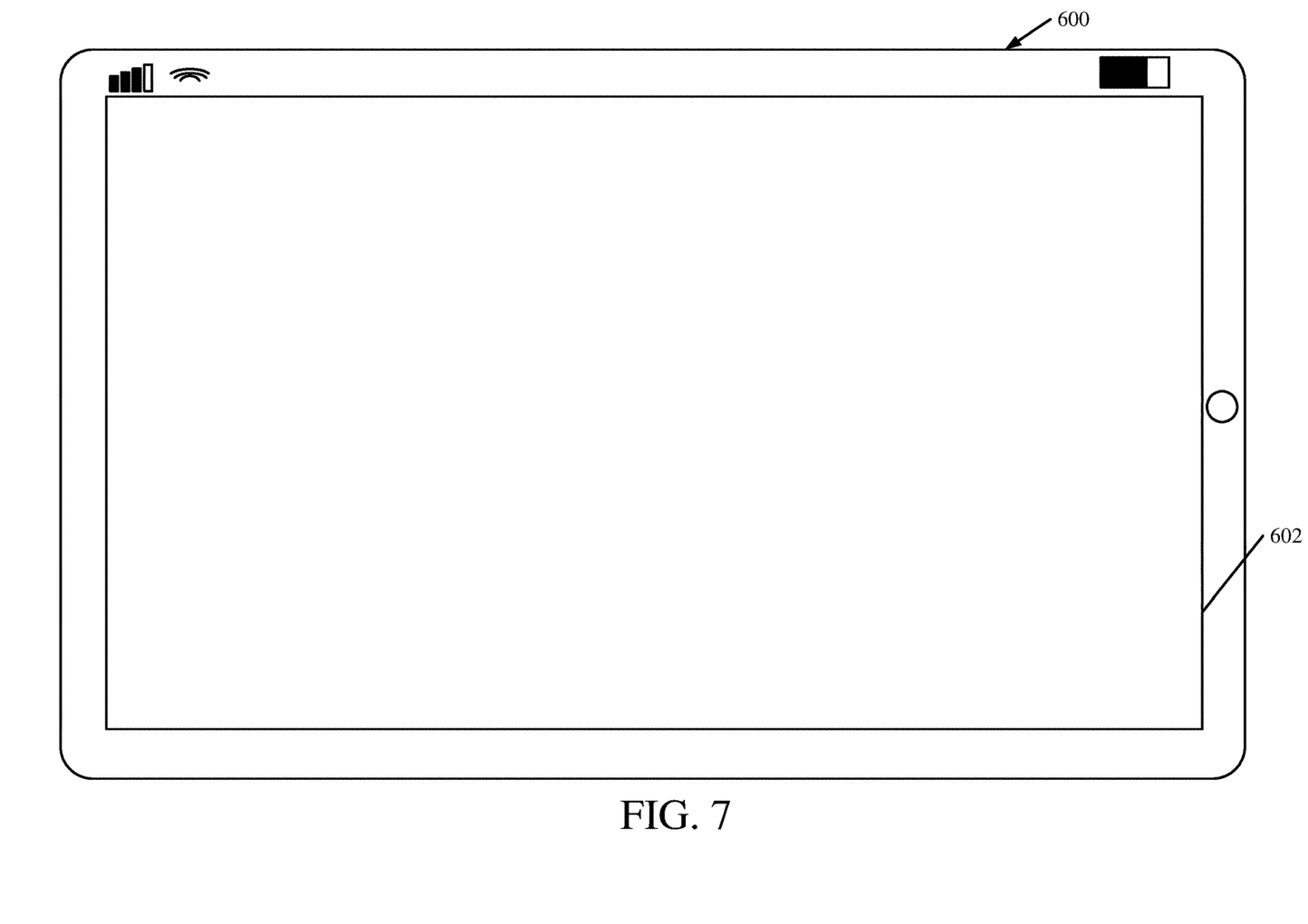
Figure 8:
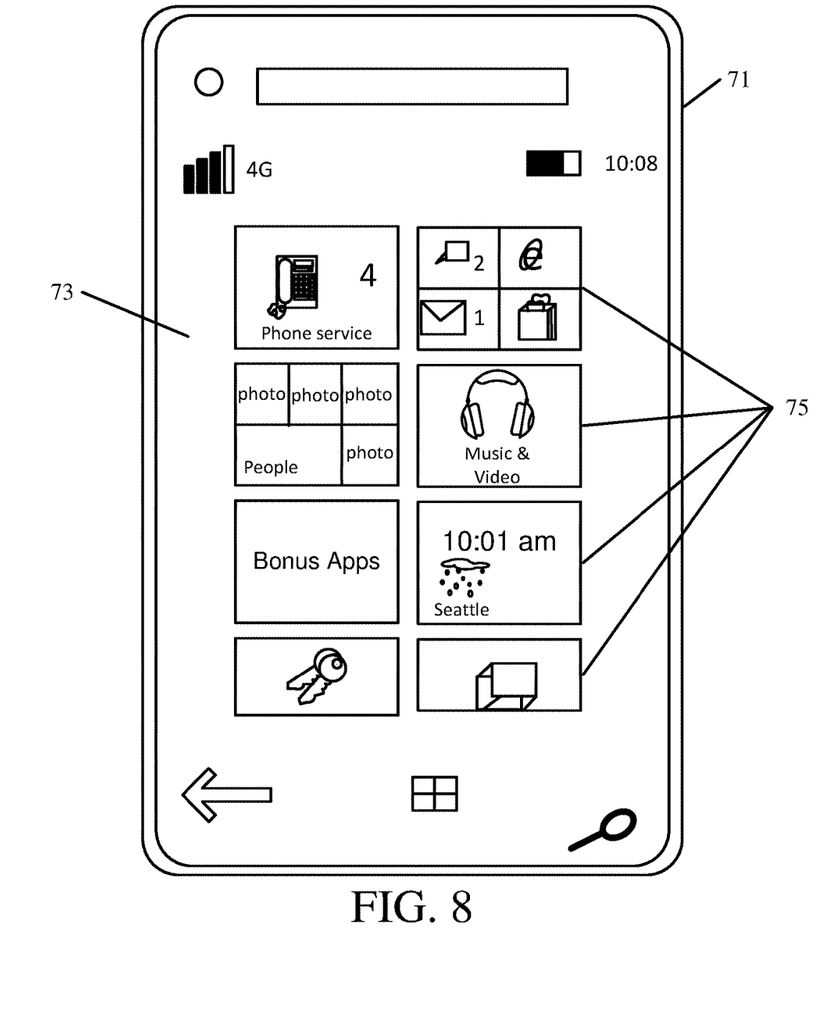
Figure 9:
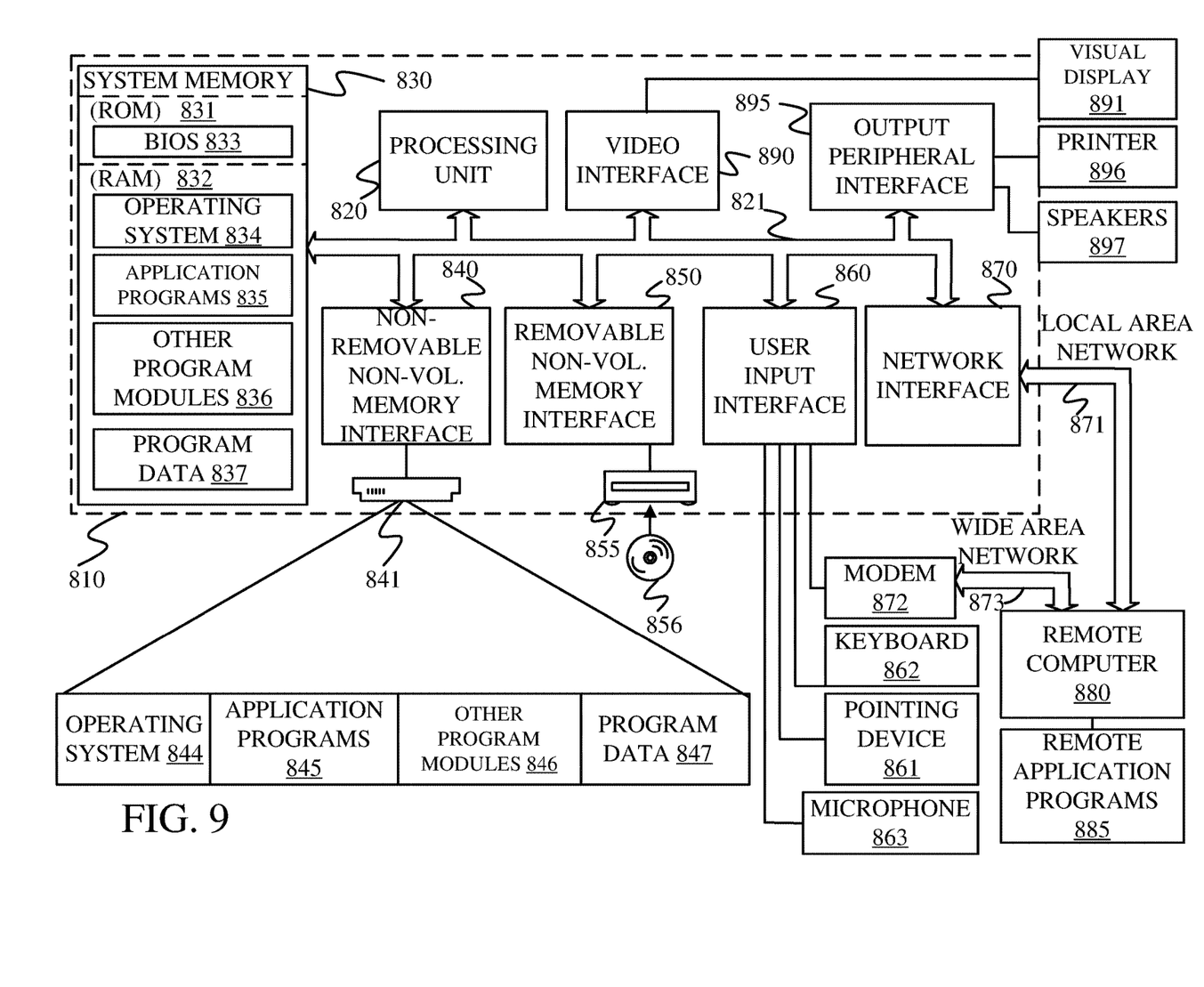
FIG. 9 is a block diagram of one example of a computing environment that can be used in the architectures illustrated in the previous figures.

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of any of the machines or it can be used by operator 122. FIGS. 7-9 are examples of handheld or mobile devices.

FIG. 6 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody a processor from previous Figures. Or one in system 120, system 126, device 504, etc.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of FIG. 1, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a method of controlling an unmanned aerial vehicle (UAV), comprising:
  controlling a propulsion system of the UAV to fly the UAV to a ground control point location at a worksite;
  collecting global navigation satellite system (GNSS) data with a GNSS receiver on the UAV, the GNSS data corresponding to the ground control point location;
  controlling the UAV to generate a ground control point mark corresponding to the ground control point location; and
  controlling movement of the UAV so the ground control point mark is visible to an aerial imaging vehicle.

Example 2 is the method of any or all previous examples wherein controlling the UAV to generate a ground control point mark comprises:
  controlling a visual mark generator on the UAV to place the ground control point on a ground surface at the ground control point location corresponding to the collected GNSS data.

Example 3 is the method of any or all previous examples wherein controlling movement of the UAV comprises:
  controlling the UAV to move away from the ground control point mark so the ground control point mark is visible to the aerial imaging vehicle.

Example 4 is the method of any or all previous examples wherein controlling the visual mark generator comprises:

controlling the visual mark generator to dispense a marker material from a reservoir on the UAV at the ground control point location corresponding to the GNSS data.

Example 5 is the method of any or all previous examples wherein controlling the visual mark generator comprises:

controlling an actuator to drop a marked item at the location of the ground control point location corresponding to the collected GNSS data.

Example 6 is the method of any or all previous examples wherein controlling the UAV to generate a ground control point mark comprises:

controlling movement of the UAV to position the UAV so a mark, fixedly attached to the UAV, is visible to the imaging aerial vehicle, in a known relation to the ground control point location corresponding to the GNSS data.

Example 7 is the method of any or all previous examples wherein controlling movement of the UAV so the ground control point mark is visible to an aerial imaging vehicle comprises:

detecting an image signal indicating that the image is taken by the imaging aerial vehicle; and controlling the UAV to remain at the ground control point location, positioned so the mark is visible to the imaging aerial vehicle, until the image signal is detected.

Example 8 is the method of any or all previous examples wherein controlling a propulsion system of the UAV to fly the UAV to a ground control point location at a worksite comprises:

receiving a plurality of different ground control point locations; and controlling the propulsion system of the UAV to successively fly the UAV to each of the plurality of different ground control point locations at the worksite.

Example 9 is the method of any or all previous examples wherein controlling a propulsion system of the UAV to fly the UAV to a ground control point location at a worksite comprises:

receiving a plurality of different ground control point locations; and controlling a propulsion system on each of a plurality of different UAVs to fly each UAV to a different one of the plurality of different ground control point locations at the worksite.

Example 10 is an unmanned aerial vehicle (UAV), comprising:

a propulsion system;

a global navigation satellite system (GNSS) receiver;

a visual mark generator; and a control system that receives a ground control point location, controls the propulsion system to fly the UAV to a ground control point at the ground control point location at a worksite, collect global navigation satellite system (GNSS) data with the GNSS receiver on the UAV, corresponding to the ground control point location and to generate a ground control point mark, with the visual mark generator, corresponding to the ground control point location.

Example 11 is the UAV of any or all previous examples wherein the control system is configured to control the propulsion system to control movement of the UAV so the ground control point mark is visible to an aerial imaging vehicle.

Example 12 is the UAV of any or all previous examples wherein the visual mark generator comprises:

a mark deposit system configured to deposit a visually detectable material to mark the ground control point location.

Example 13 is the UAV of any or all previous examples wherein the mark deposit system comprises:

a material dispenser that controllably dispenses a pigmented substance on a surface at the ground control point location.

Example 14 is the UAV of any or all previous examples wherein the visual mark generator comprises:

a dropping mechanism configured to drop a physical medium holding the mark at the ground control point location.

Example 15 is the UAV of any or all previous examples wherein the visual mark generator comprises:

a mark, fixedly attached to the UAV, on a surface that is visible to the imaging aerial vehicle, in a known relation to the ground control point location corresponding to the GNSS data.

Example 16 is the UAV of any or all previous examples wherein the control system is configured to detect an image signal indicating that the image is taken by the imaging aerial vehicle control the UAV to remain at the ground control point location, positioned so the mark is visible to the imaging aerial vehicle, until the image signal is detected.

Example 17 is a method of establishing a set of ground control points at a worksite, the method comprising:

flying each of a plurality of different unmanned aerial vehicles (UAVs) to a different, corresponding ground control point in the set of ground control points;

controlling movement of each of the plurality of different UAVs to remain at the corresponding ground control point until an aerial imaging vehicle captures an aerial image that includes the UAV at the corresponding ground control point; and collecting global navigation satellite system (GNSS) data with a GNSS receiver mounted on each of the UAVs, the GNSS data collected by each GNSS receiver identifying the ground control point corresponding to the UAV on which the GNSS receiver is mounted.

Example 18 is the method of any or all previous examples wherein flying each of a plurality of different unmanned aerial vehicles (UAVs) to a different, corresponding ground control point, comprises:

positioning each UAV so that a surface of the UAV, that includes a ground control point mark in a predetermined spatial relationship to the ground control point, is visible by the aerial imaging vehicle.

Example 19 is the method of any or all previous examples wherein collecting GNSS data comprises:

collecting the GNSS data while remaining at the corresponding ground control point until the aerial imaging vehicle captures the aerial image.

Example 20 is the method of any or all previous examples wherein flying each of a plurality of UAVs to a different ground control point comprises:

receiving a set of ground control point locations corresponding to the set of ground control points; and loading a ground control point location into a navigation system of each of the UAVs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a fleet of unmanned aerial vehicles (UAVs), comprising:
controlling a respective propulsion system of each of a first plurality of UAVs in the fleet to fly each of the first plurality of UAVs to, and land at, a different respective ground control point location at a worksite;
receiving a respective pose signal, from one or more pose sensors on each of the first plurality of UAVs, indicative of a slope of terrain at the respective ground control point location;
collecting global navigation satellite system (GNSS) data with a GNSS receiver on each of the first plurality of UAVs, wherein the GNSS data corresponds to the respective ground control point location and is compensated based on the respective pose signal;
controlling each of the first plurality of UAVs to generate a respective ground control point mark corresponding to the respective ground control point location;
controlling movement of each of the first plurality of UAVs so the respective ground control point marks are visible to an aerial imaging vehicle; and
controlling each of a second plurality of UAVs in the fleet to fly over different respective ground control point locations and capture, with an imaging system on each of the second plurality of UAVs, an image of the respective ground control point location including the respective ground control point mark.

2. The method of claim 1 wherein controlling each of the first plurality of UAVs to generate the respective ground control point marks comprises:
controlling a respective visual mark generator on each of the first plurality of UAVs to place the respective ground control point mark on a respective ground surface at the respective ground control point location corresponding to the collected GNSS data.

3. The method of claim 2 wherein controlling movement of each of the first plurality of UAVs comprises:
controlling each of the first plurality of UAVs to move away from the respective ground control point mark so the respective ground control point mark is visible to a respective UAV in the second plurality of UAVs.

4. The method of claim 3 wherein controlling the respective visual mark generators comprises:
controlling the respective visual mark generator to dispense a marker material from a respective reservoir on each of the first plurality of UAVs at the respective ground control point location corresponding to the GNSS data.

5. The method of claim 4 wherein controlling the respective visual mark generator comprises:
controlling a respective actuator of each one of the first plurality of UAVs to drop a respective marked item at the respective ground control point location corresponding to the collected GNSS data.

6. The method of claim 1 wherein controlling each of the first plurality of UAVs to generate the respective ground control point mark comprises:
controlling movement of each of the first plurality of UAVs to position each of the first plurality of UAVs so a respective mark, fixedly attached to each of the first plurality of UAVs, is visible to a respective UAV in the second plurality of UAVs, in a known relation to the respective ground control point location corresponding to the GNSS data.

7. The method of claim 6 wherein controlling movement of each of the first plurality of UAVs so the respective ground control point mark is visible to the respective UAV of the second plurality of UAVs comprises:
detecting an image signal indicating that an image is taken by the respective UAV of the second plurality of UAVs; and
controlling each of the first plurality of UAVs to remain at the respective ground control point location, positioned so the respective mark is visible to the respective UAV of the second plurality of UAVs, until the image signal is detected.

8. An unmanned aerial vehicle (UAV), comprising:
a propulsion system;
a global navigation satellite system (GNSS) receiver comprising a GNSS antenna;
one or more pose sensors;
a visual mark generator configured to generate a visual ground control point mark; and
a control system configured to:
receive a ground control point location;
control the propulsion system to fly the UAV to a ground control point at the ground control point location at a worksite;
receive a GNSS signal from the GNSS receiver;
receive a pose signal, from the one or more pose sensors, indicative of a slope of terrain at the ground control point location;
generate global navigation satellite system (GNSS) data, corresponding to the ground control point location, based on the GNSS signal and the pose signal; and
control the visual mark generator to generate the visual ground control point mark corresponding to the ground control point location.

9. The UAV of claim 8 wherein the control system is configured to control the propulsion system to control movement of the UAV so the ground control point mark is visible to an aerial imaging vehicle.

10. The UAV of claim 9 wherein the visual mark generator comprises:
a mark deposit system configured to deposit a visually detectable material to mark the ground control point location.

11. The UAV of claim 10 wherein the mark deposit system comprises:
a material dispenser that controllably dispenses a pigmented substance on a surface at the ground control point location.

12. The UAV of claim 9 wherein the visual mark generator comprises:
a dropping mechanism configured to drop a physical medium holding the ground control point mark at the ground control point location.

13. The UAV of claim 9 wherein the visual mark generator comprises:
a mark, fixedly attached to the UAV, on a surface that is visible to the aerial imaging vehicle, in a known relation to the ground control point location corresponding to the GNSS data.

14. The UAV of claim 13 wherein the control system is configured to detect an image signal indicating that an image is taken by the aerial imaging vehicle, and to control the UAV to remain at the ground control point location, positioned so the mark is visible to the aerial imaging vehicle, until the image signal is detected.

15. A method of establishing a set of ground control points at a worksite, the method comprising:

flying each of a plurality of different unmanned aerial vehicles (UAVs) to a different respective ground control point in the set of ground control points;

controlling movement of each of the plurality of different UAVs to remain at the respective ground control point until an aerial imaging vehicle captures an aerial image that includes the respective UAV at the respective ground control point; and collecting global navigation satellite system (GNSS) data with a GNSS receiver mounted on each of UAVs, wherein the GNSS data collected by each GNSS receiver identifies the respective ground control point corresponding to a respective UAV, of the plurality of different UAVs, on which the GNSS receiver is mounted and is compensated based on a pose signal generated by one or more pose sensors on the respective UAV, the pose signal being indicative of a slope of terrain at the respective ground control point location.

16. The method of claim 15 wherein flying each of the plurality of different unmanned aerial vehicles (UAVs) to the different respective ground control points, comprises:

positioning each UAV so that a surface of the UAV, that includes a ground control point mark in a predetermined spatial relationship to the ground control point, is visible to the aerial imaging vehicle.

17. The method of claim 15 wherein collecting GNSS data comprises:

collecting the GNSS data while remaining at the respective ground control point until the aerial imaging vehicle captures the aerial image.

18. The method of claim 15 wherein flying each of the plurality of UAVs to the different ground control points comprises:

receiving a set of ground control point locations corresponding to the set of ground control points; and loading a ground control point location into a navigation system of each of the plurality of UAVs.

* * * * *